United States Patent
Jansson et al.

(10) Patent No.: US 8,693,388 B2
(45) Date of Patent: Apr. 8, 2014

(54) SPACE BASED LOCAL AREA NETWORK (SBLAN)

(75) Inventors: Gerard Jansson, Washington, DC (US); Salim Yaghmour, Washington, DC (US)

(73) Assignee: Intelsat Global Service LLC, Washington, DC (US)

( * ) Notice: Subject to any disclaimer, the term of this patent is extended or adjusted under 35 U.S.C. 154(b) by 102 days.

(21) Appl. No.: 13/126,567

(22) PCT Filed: Oct. 28, 2009

(86) PCT No.: PCT/US2009/062357
§ 371 (c)(1),
(2), (4) Date: Jul. 20, 2011

(87) PCT Pub. No.: WO2010/051308
PCT Pub. Date: May 6, 2010

(65) Prior Publication Data
US 2012/0020280 A1   Jan. 26, 2012

Related U.S. Application Data

(60) Provisional application No. 61/109,060, filed on Oct. 28, 2008.

(51) Int. Cl.
*H04B 7/185* (2006.01)
(52) U.S. Cl.
USPC .......................................................... 370/316
(58) Field of Classification Search
USPC ............................ 370/254–340; 709/201–213
See application file for complete search history.

(56) References Cited

U.S. PATENT DOCUMENTS

| 2004/0192197 A1* | 9/2004 | Capots et al. ................ 455/12.1 |
| 2006/0040612 A1* | 2/2006 | Min .............................. 455/12.1 |
| 2007/0243822 A1 | 10/2007 | Monte et al. |
| 2008/0018802 A1 | 1/2008 | Yu |
| 2008/0045146 A1* | 2/2008 | Wahlberg et al. ............ 455/12.1 |

FOREIGN PATENT DOCUMENTS

WO    2008/060760 A2    5/2008

OTHER PUBLICATIONS

International Search Report of PCT/US2009/062357 dated Dec. 29, 2009.

* cited by examiner

*Primary Examiner* — Ayaz Sheikh
*Assistant Examiner* — Debebe Asefa
(74) *Attorney, Agent, or Firm* — Sughrue Mion, PLLC

(57) ABSTRACT

A spaced based local area network system for providing dynamically allocated downlink services for spacecraft in Geosynchronous Earth Orbit. The system includes at least two client satellites which host an inter-satellite communications payload; a hub satellite which hosts an inter-satellite communications payload, a downlink communications payload, and an aggregator payload; and a ground station which transmits data to and receives data from the hub satellite. The hub satellite, using the aggregator payload, aggregates at least two data flows received from the at least two client satellites over an inter-satellite link, by the inter-satellite communications payload, into a data stream that is downlinked to the ground station, using the downlink communications payload, over a space-to-ground link.

25 Claims, 13 Drawing Sheets

SPACE BASED LOCAL AREA NETWORK (SBLAN)

CROSS-REFERENCE TO RELATED APPLICATION

This application claims priority from U.S. Provisional Application No. 61/109,060, filed on Oct. 28, 2008.

BACKGROUND OF THE INVENTION

1. Field of the Invention

Apparatuses, system architectures, and methods consistent with the invention relate to space based communications, and more particularly, to a space based local area network (SbLAN).

2. Description of the Related Art

In the conventional art, a spacecraft such as a satellite communicates over a space-to-ground link. The conventional communications subsystem in the spacecraft which is required to facilitate the space-to-ground link is costly in terms of size, weight, and power (SWaP).

The SWaP of the conventional communications subsystem in conventional spacecraft limits the capabilities which can be dedicated to the spacecraft mission. Additionally, larger and costlier spacecraft are required in order to accommodate the SWaP of the communications subsystem which is required to facilitate the space-to-ground link. Operations cost is thus increased due to the communications subsystem which is required to facilitate the space-to-ground link.

SUMMARY OF THE INVENTION

Exemplary embodiments of the present invention may overcome the above disadvantages and other disadvantages not described above. The present invention is not necessarily required to overcome at least some of the disadvantages described above, and the exemplary embodiments of the present invention may not overcome at least some of the problems described above. The appended claims should be consulted to ascertain the true scope of the invention.

Exemplary embodiments of the present invention relate to a space based local area network system, a space based local area networking kit, and a method for providing dynamically allocated downlink services for spacecraft in Geosynchronous Earth Orbit.

According to an exemplary embodiment of the present invention, a space based local area network system for providing dynamically allocated downlink services for spacecraft in Geosynchronous Earth Orbit is provided. The system includes at least two client satellites which host an inter-satellite communications payload; a hub satellite which hosts an inter-satellite communications payload, a downlink communications payload, and an aggregator payload; and a ground station which transmits data to and receives data from the hub satellite.

The hub satellite, using the aggregator payload, aggregates at least two data flows received from the at least two client satellites over an inter-satellite link, by the inter-satellite communications payload, into a data stream that is downlinked to the ground station, using the downlink communications payload, over a space-to-ground link.

In another embodiment, the ground station includes a space based local area network kit including a gateway router and a software defined radio. The gateway router routes data through the software defined radio which transmits data to and receives data from the hub satellite over the space-to-ground link.

In another embodiment, the hub satellite is a switched digital hub which includes a space based local area networking kit including a software defined radio and an Internet protocol router. Signals received at the hub satellite are demodulated and packets are routed, and packet data is remodulated onto the space-to-ground link or an inter-satellite link.

In another embodiment, the software defined radio hosts the Internet protocol router.

In another embodiment, the Internet protocol router is separate from the software defined radio.

In another embodiment, the hub satellite is a bent pipe hub which includes a space based local area networking kit comprising a radio frequency switching network.

In another embodiment, the radio frequency switching network includes first dedicated uplink and first dedicated downlink RF channels for the space-to-ground link; and second dedicated uplink and second dedicated downlink Ka-band channels for hub-to-client links.

In another embodiment, the radio frequency switching network further includes Ka-to-Ka band translation for communication between client satellites.

In another embodiment, the at least two client satellites include a space based local area network kit including a software defined radio and an Internet protocol router.

In another embodiment, the software defined radio hosts the Internet protocol router.

In another embodiment, the Internet protocol router is separate from the software defined radio.

In another embodiment, a frequency band around 22.5 GHz is used for data transfer over the inter-satellite link between the at least two client satellites and the hub satellite.

In another embodiment, the inter-satellite link uses an 802.16 physical layer.

In another embodiment, the 802.16 physical layer uses 8PSK modulation and a low density parity check coding scheme.

In another embodiment, the hub satellite further includes a sector beam antenna, and the at least two client satellites further comprise a steerable spot beam antenna.

In another embodiment, the at least two client satellites are positioned within 300 km of the hub satellite.

In another embodiment, the software defined radio includes a first IF/RF digital slice and a second IF/RF digital slice. The first IF/RF digital slice and the second IF/RF digital slice each include an integrated package of multiple field programmable gate arrays, application specific integrated circuits, high-speed memory, and I/O ports.

In another embodiment, the first IR/RF digital slice is a Ka-band IF/RF digital slice and the second IF/RF digital slice is a C-band IF/RF digital slice. The first IF/RF digital slice includes software or firmware for performing Ka-band signal transmission, and the second IF/RF digital slice includes software or firmware for performing C-band signal transmission.

In another embodiment, the software defined radio includes a Ka-band IF/RF digital slice. The Ka-band IF/RF digital slice includes an integrated package of multiple field programmable gate arrays, application specific integrated circuits, high-speed memory, and I/O ports, and the Ka-band IF/RF digital slice includes software or firmware for performing Ka-band signal transmission.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Figure 1:
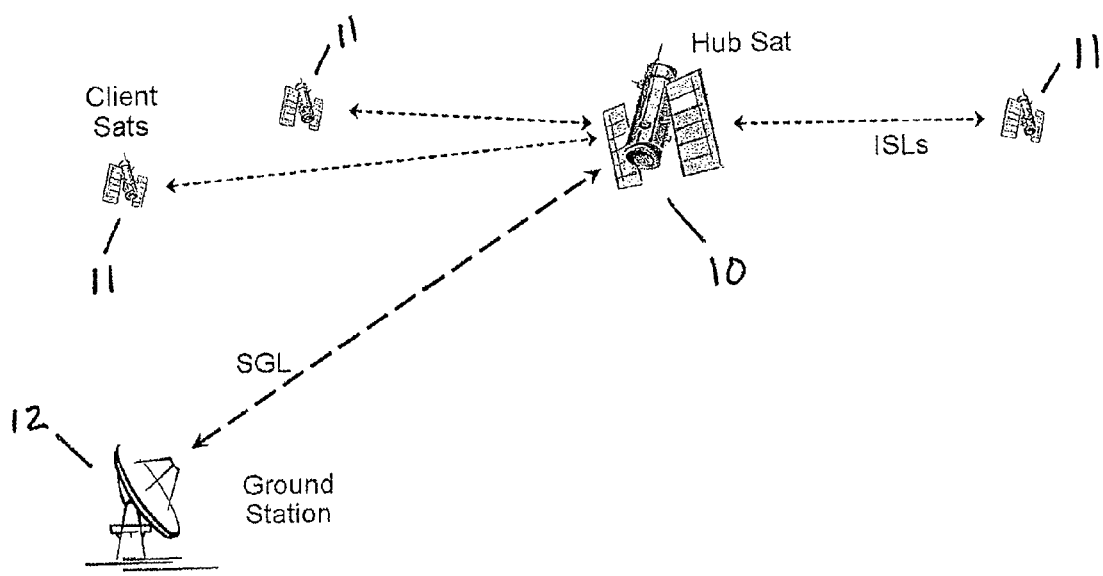
FIG. 1 shows a system diagram of an exemplary embodiment of the SbLAN.

Exemplary embodiments will be described in detail below with reference to accompanying drawings so as to be easily realized by a person having ordinary knowledge in the art. The present invention may be embodied in various forms without being limited to the exemplary embodiments set forth herein. Descriptions of irrelevant parts are omitted for clarity, and like reference numerals refer to like elements throughout.

FIG. 1 shows an exemplary embodiment of the SbLAN system. The SbLAN system is a common-use infrastructure providing dynamically allocated data downlink services and interconnectivity for multiple user spacecraft in Geosynchronous Earth Orbit (GEO). A commercial communication satellite is used as a hub 10 which hosts a short-range inter-satellite communications payload to provide data downlink communication capability for mission or client satellites 11.

Client satellites 11 are equipped with SbLAN inter-satellite communication payloads and pass client data to/from the SbLAN hub satellite 10. The hub satellite 10 includes a more sophisticated SbLAN payload that provides an on-demand multiple access relay service between each client satellite 11 and a ground station 12. Services include ≥100 Mbps aggregate relay data downlink and ≤100 Mbps relay data uplink with latency 600 ms. The SbLAN relay link uses Low Density Parity Check (LDPC) channel codes with standard IP based ARQ mechanisms to ensure delivery of error-free data in both the downlink and the uplink directions.

According to an exemplary embodiment, the SbLAN architecture reduces client telecom subsystem SWaP and reduces operations cost via shared on-demand service, enabling smaller and more responsive client spacecraft 11. In an exemplary embodiment, the total weight of the client telecom subsystem is 12.8 kg when using an integrated router or 22.8 kg when using a separate router. The client telecom subsystem includes an SDR with dimensions of 4.0" (h)×7.2" (w)×8.6" (d), an optional integrated router with dimensions of 8.0"×8.2"×14.0", four solid state power amplifiers each with dimensions of 1.0"×16.1"×17.2", and a steerable antenna which is a cylinder with a diameter of 11.0" and a height of 17.0".

Figure 2:
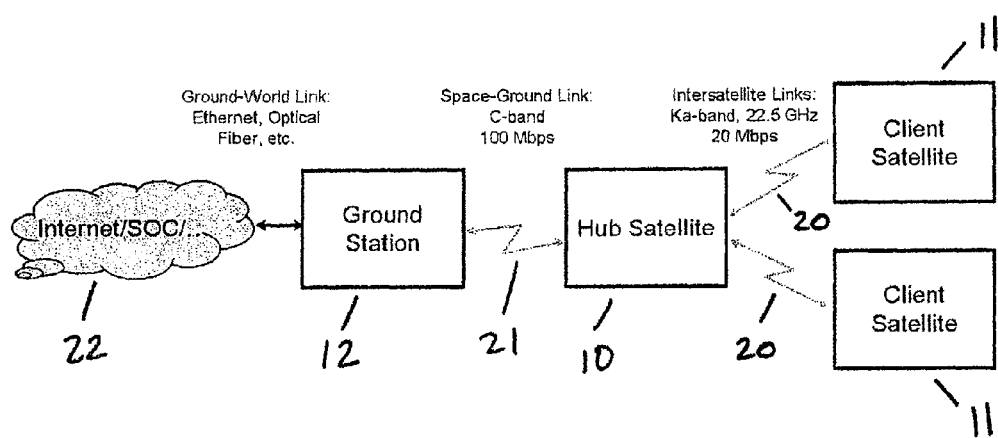
FIG. 2 shows the inter-satellite links, space-ground link, and ground-world link in an exemplary embodiment of the SbLAN.

In the SbLAN system shown in FIG. 1, the client spacecraft 11 fly between 150 km and 300 km from the commercial communication hub 10. As shown in FIG. 2, the inter-satellite links (ISLs) 20 provide data services up to 20 Mbps at ranges up to 150 km between the hub satellite 10 and the client spacecraft. The hub satellite 10 aggregates a plurality of these data flows from one or more of the client spacecraft into a 100 Mbps data stream 21 that is downlinked to the ground station 12. At the ground station 12, the data passes through a gateway router and on to authenticated users via the Internet or Global Information Grid (GIG) 22.

Overview

Exemplary embodiments of the SbLAN system include three SbLAN kits, which are total payload packages including all hardware, software, and interfaces: a kit for the ground SbLAN element, a kit for the hub SbLAN element, and a kit for the client SbLAN elements. The signal chain between the ground station 12 and the hub 10, and between the hub and the client satellites 11, is discussed below.

Ground Station

Figure 3:
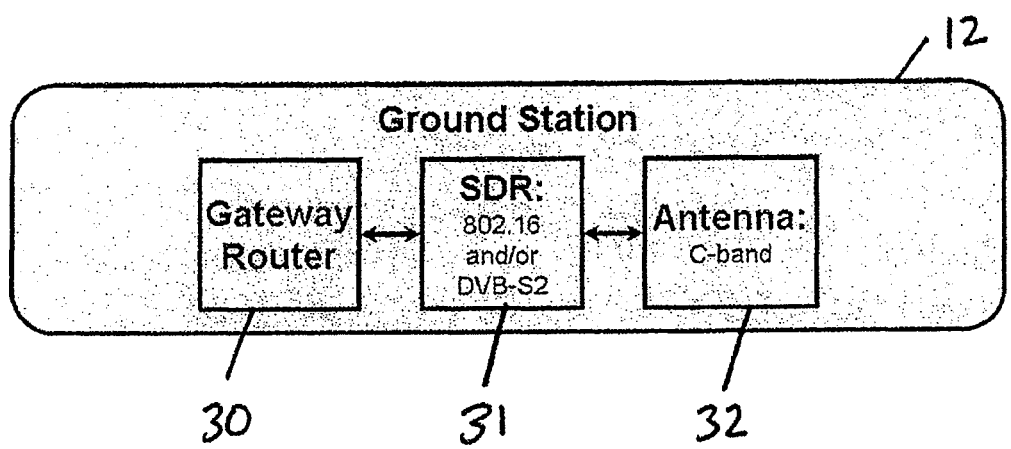
FIG. 3 is a diagram of the SbLAN kit for the ground station according to an exemplary embodiment.

An exemplary embodiment of the SbLAN kit for the ground station 12 is shown in FIG. 3. The kit includes a gateway router 30 which connects the networked world to the SbLAN. The gateway router 30 routes data through an SDR 31 on the ground that transmits and receives data to/from the hub satellite over the space-to-ground link (SGL) via C-band antenna 32. Alternatively, the SDR 31 transmits and receives data to/from the hub satellite 10 over the SGL link via Ku-, Ka-, S-, or X-band antennas.

The SDR 31 is implemented using a modular, slice-based architecture. Typical slice functions are the power supply slice, the digital slice, and an IF/RF slice. The SDR 31 is further discussed below. The implementation of the ground station 12 does not require space qualified hardware and thus has the lowest complexity of the three SbLAN kits. Additionally, ground station components can be modified, upgraded, or replaced readily throughout the mission lifetime.

Hub Satellite

According to an exemplary embodiment of the SbLAN system, the hub satellite 10 is a switched digital hub. According to another exemplary embodiment of the SbLAN system, the hub satellite 10 is a bent-pipe hub. The switched digital hub and the bent pipe hub are described below.

The embodiment in which the hub satellite 10 is a switched digital hub and the embodiment in which the hub satellite 10 is a bent-pipe hub differ in the functionality of the hub satellite 10. The switched digital hub embodiment is based on a digital processing architecture that performs demod routing and remod functions on board the satellite, as part of the relay service. In the analog bent-pipe embodiment, complexity, SWaP, and cost are all reduced at the expense of bandwidth efficiency, networking flexibility, and post-launch upgradeability.

Switched Digital Hub

In an exemplary embodiment of the SbLAN switched digital hub, all signals received at the hub 10 are demodulated and packets are routed. The packet data is then remodulated onto the SGL 21 if being downlinked, or the ISL 20 if being crosslinked. Depending on the physical layer protocol selected for the SGL 21 and ISLs 20 (e.g., 802.16 and DVB-S2 according to exemplary embodiments), protocol translation may be required at the hub when data traffic is routed through the SGL 21.

Figure 4:
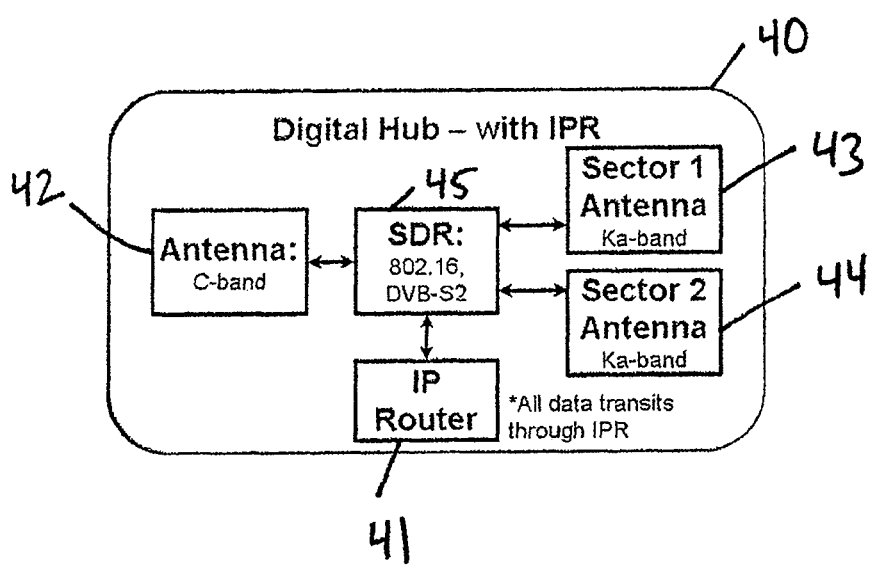
FIG. 4 is a diagram of a switched satellite digital hub including a separate IP router according to an exemplary embodiment of the SbLAN.

Various SbLAN switched digital hub embodiments include different implementations of the network routing functions. FIG. 4 shows an embodiment of a switched digital hub 40 which includes a separate full-featured IP router (IPR) 41 capable of 700 Mbps data rates. In this embodiment, all network data passes through the IPR 41. The 700 Mbps IP routing capability in this embodiment comes at the cost of the additional SWaP of the standalone IPR.

All signals received at the hub 40 via space-to-ground RF link (e.g., C-band antenna 42), Ka-band sector 1 antenna 43, and Ka-band sector 2 antenna 44 are demodulated by the SDR 45 and packets are routed by the IPR 41. The packet data is then remodulated by the SDR 45 onto the SGL 21 if being downlinked, or the ISL 20 if being crosslinked. Depending on the physical layer protocol selected for the SGL 21 and ISLs 20 (e.g., 802.16 and DVB-S2 according to exemplary embodiments), protocol translation may be required at the hub when data traffic is routed through the SGL 21.

Figure 5:
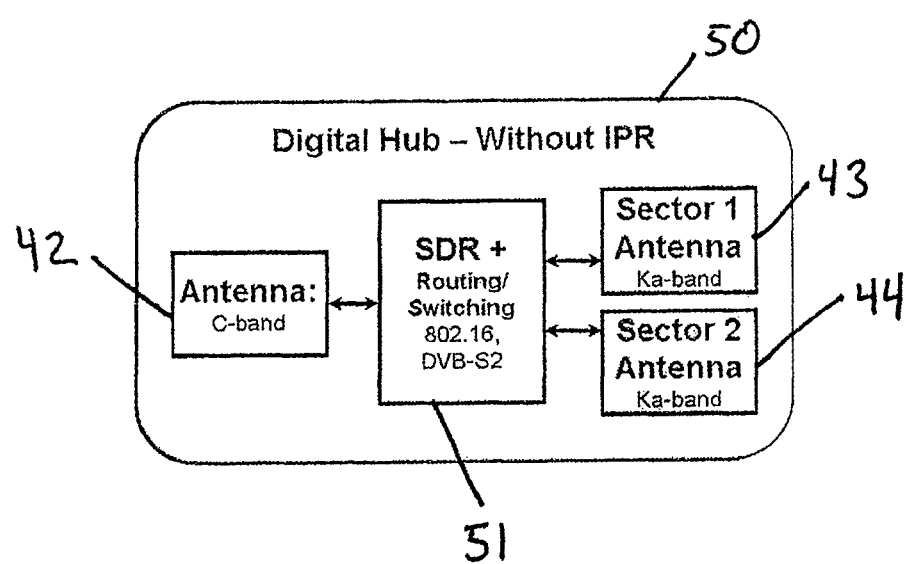
FIG. 5 is a diagram of a switched digital hub in which IP routing functions are hosted in a software defined radio (SDR) platform according to another exemplary embodiment of the SbLAN.

FIG. 5 illustrates another embodiment of a switched digital hub 50, representing a lower SWaP approach. In this embodiment, the IP routing functions are hosted in the SDR platform 51 at the cost of reduced routing throughput. All signals received at the hub 50 via the space-to-ground RF link (e.g., C-band antenna 42), Ka-band sector 1 antenna 43, and Ka-band sector 2 antenna 44 are demodulated by the SDR 51 and routing functions are performed by the SDR 51. There is no mass increase if the routing functions are hosted in a field programmable gate array (FPGA) within the SDR 51 while the routing tables are maintained in the software stacks of the existing SDR CPU. In this embodiment, the power draw of the SDR 51 is increased by 5-10 W to accommodate the routing functions. The SDR based router has a reduced throughput capacity of 120 Mbps compared to the 1 Gbps capability of the standalone IPR embodiment. Both embodiments meet the 100 Mbps aggregate Hub rate required to manage the 100 Mbps DL pipe. The SDR router rate limit of 120 Mbps is derived from current SDR memory limits. Currently, the SDR router throughput can be increased in increments of 60 Mbps per additional memory chip at a cost of 2 W per chip. Future advances to reduce this cost and increase the rate limit are expected.

Analog Bent-Pipe Hub

Figure 6:
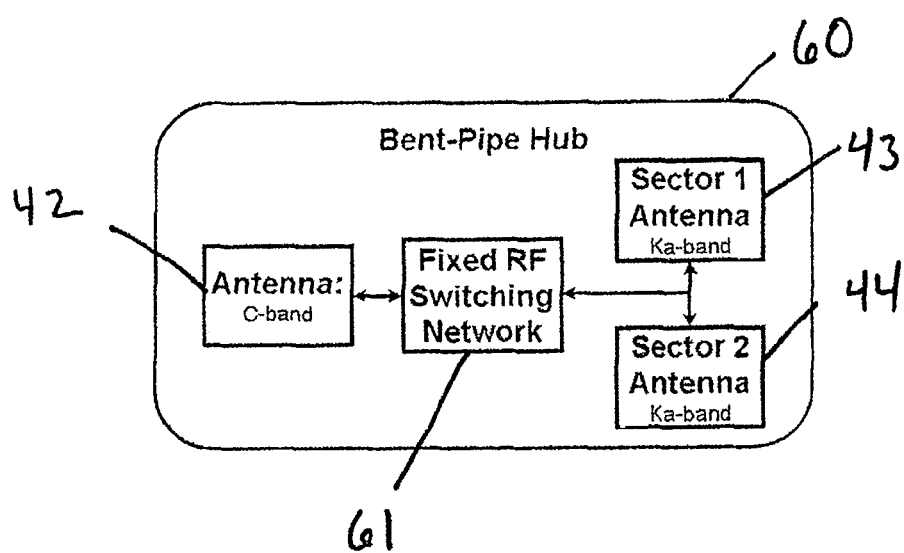
FIG. 6 is a diagram of a bent-pipe hub according to an exemplary embodiment of the SbLAN.

FIG. 6 shows an exemplary embodiment of the SbLAN system including the bent-pipe hub configuration 60. In this embodiment, the hub 60 performs a frequency translation of all inbound signals arriving via space-to-ground RF link (e.g., C-band antenna 42), Ka-band sector 1 antenna 43, and Ka-band sector 2 antenna 44 to an outbound frequency based on a fixed mapping. The result is a lower cost and SWaP hardware implementation based on industry standard analog RF components.

Figure 7:
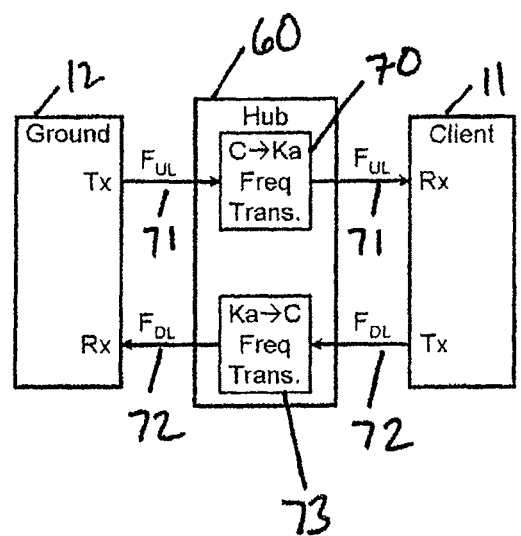
FIG. 7 shows a 2-channel embodiment of the bent-pipe hub.
Figure 8:
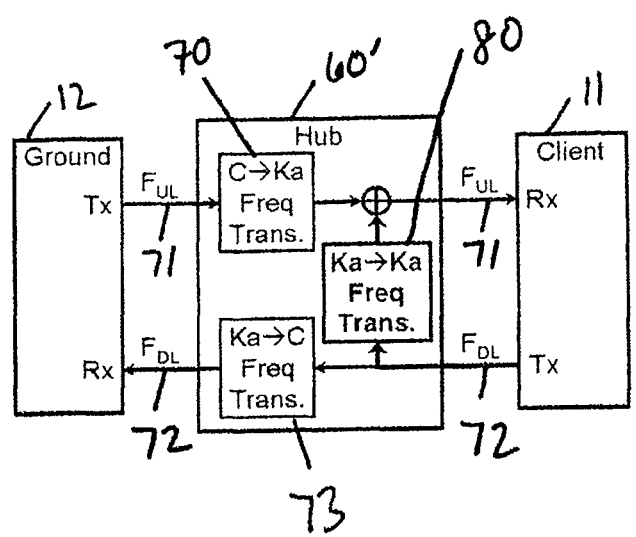
FIG. 8 shows another 2-channel embodiment of the bent-pipe hub.

The bent-pipe embodiment 60 uses an RF switching network 61 with dedicated uplink (UL) ground-to-space RF link and dedicated downlink (DL) space-to-ground RF link (e.g., C-band antenna) channels for the SGL 21. There are also corresponding UL and DL channels at Ka-band for the hub-to-client links. FIGS. 7 and 8 show the mapping from C-band to Ka-band 70, and Ka-band to C band 73, which is direct for the UL and DL channels, where $F_{UL}$ 71 and $F_{DL}$ 72 are the UL and DL channels, respectively. However, to provide client-to-client communications, the data must either be downlinked to the ground and uplinked to the destination client satellite as shown in FIG. 7, or an additional Ka-to-Ka band translation 80 must be provided at the hub 60' as shown in FIG. 8. If Ka-to-Ka translation 80 is used as shown in FIG. 8, the result is a full duplex broadcast channel that requires a time division multiple access (TDMA) protocol which is managed at the ground.

Figure 9:
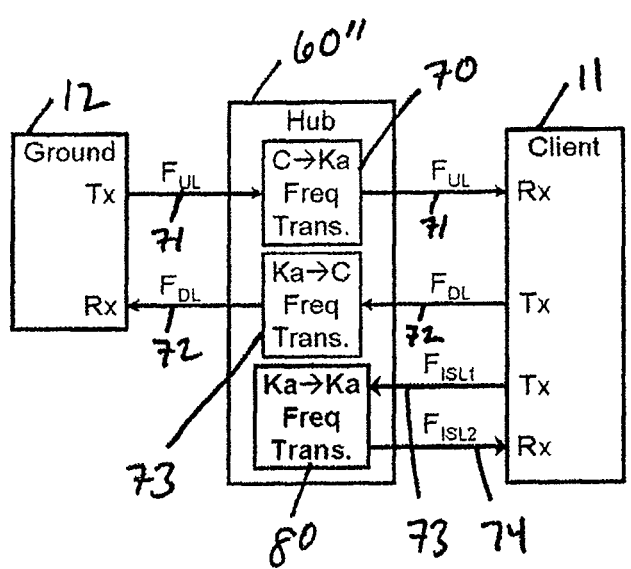
FIG. 9 shows a 4-channel embodiment of the bent-pipe hub in which two channels are used as a dedicated crosslink pathway for the client satellites.

For TDMA systems, there can be only one client satellite 11 transmitting on the DL channel at any time, regardless of whether a Ka-to-Ka translator 80 is used. If the Ka-to-Ka translator 80 is used, then only one node in the network can access the UL channel at any time. In an alternative embodiment, shown in FIG. 9, an additional two channels are allocated at Ka-band as a dedicated crosslink pathway for the client satellites 11. The ($F_{UL}$, $F_{DL}$) channels 71, 72 are dedicated solely to the SGL 21 UL/DL, and the new set of Ka-band channels, ($F_{ISL1}$, $F_{ISL2}$) 73, 74 are dedicated to the client-to-client ISLs 20. As in the 2-channel embodiments, a multiple access mechanism is required for the ($F_{ISL1}$, $F_{ISL2}$) 73, 74 channels, however, it does not necessarily require management by the ground station 12. Instead, a slotted-ALOHA-type scheme may be applied, but with its inherent throughput inefficiencies. Alternately, a crosslink TDMA scheme managed at the ground may be used.

In the 4-channel embodiments, the hardware is the same as for the 2-channel embodiments when using the Ka-to-Ka frequency translator 80, but there is no conflict between the client crosslinks and the SGL 21. The cost in both of these scenarios, however, is the highly inefficient use of spectral resources. For this type of utilization, the dedicated UL channels will largely go unused. In the 4-channel embodiments, it is also reasonable to assume that these links will only sparsely be used (but at those times potentially near capacity), and again, there would be a significant amount of unused resources.

Client Satellite

Figure 10:
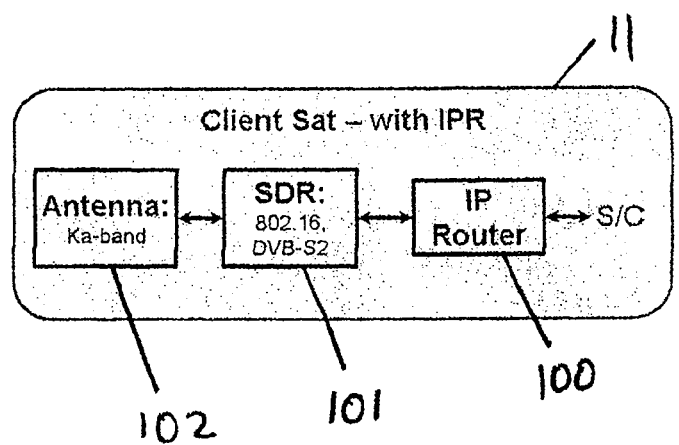
FIG. 10 shows an exemplary embodiment of the SbLAN kit for the client satellite including separate IP routing hardware.
Figure 11:
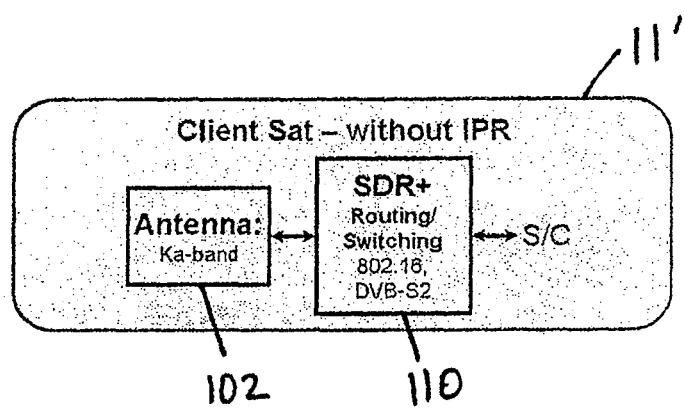
FIG. 11 shows another exemplary embodiment of the SbLAN kit for the client satellite in which the IP routing functions are hosted in the SDR.

FIG. 10 shows an exemplary embodiment of the SbLAN kit for the client satellite 11 including separate IP routing hardware 100, SDR 101, and Ka-band antenna 102. FIG. 11 shows another exemplary embodiment of the SbLAN kit for the client satellite 11' in which the IP routing functions are hosted in the SDR 110. The SbLAN kit for the client satellite also includes Ka-band antenna 102.

The largest SWaP contributor in the client kit is the IPR 100, contributing 10 kg and drawing 32 W. The IPR 100 at the client satellites may not be necessary, however, if sufficient routing functionality is provided by the hub 10. Thus, in an exemplary embodiment, the client SbLAN kit only provides switching from/to the source/destination node(s) on the client satellites 11.

Radio Frequency Selection

The selection of a suitable RF frequency (or frequencies) for ISL communications 20 is a significant imperative for optimization of exemplary embodiments of the SbLAN system. Features such as available bandwidth, availability of consumer-off-the-shelf (COTS) hardware, the need for interference control and, ease of coordination with regulatory agencies, were considered while selecting the most suitable ISL frequency band for exemplary embodiments of the SbLAN system.

After carefully considering all the factors, ITU and other international regulatory agencies have allocated selected frequencies in Ka-band for ISL operations. Of these, the frequency band centered at 22.5 GHz is optimal owing to its commercial availability and the spacecraft technology maturity. Moreover, 22.5 GHz is the absorption frequency for water vapor and, hence, provides natural protection against interference from the ground systems.

Hence, in an exemplary embodiment, the frequency band around 22.5 GHz is selected for ISL data transfer between the hub (host) satellite and the user (mission) satellites in the SbLAN system.

Modulation Scheme

Considerations influencing the selection of the physical layer (PHY) in an exemplary embodiment of the SbLAN system include both the channel characteristics and the hardware implementation. In an exemplary embodiment of the SbLAN system, the channel is a basic line-of-sight (LOS) channel in that the client satellites 11 will be in view of the hub 10 and there will be minimal scattering/multipath sources as a result of antenna characteristics and placement. Further, there will be low Doppler dynamics. As a result, mitigation of multipath and mobility effects is not an issue and therefore no essential benefit is derived from the use of an orthogonal frequency division multiplexing (OFDM) signaling scheme.

Given the SbLAN inter-satellite RF environment, according to an exemplary embodiment, the PHY preferably employs a simple single carrier modulation scheme. To this end, 802.16 incorporates single carrier modulation specifically designed for the 22-23 GHz operating frequencies. The modulations available in 802.16 using single carrier modulation are QPSK, 16-QAM and 64-QAM. To further improve the signaling envelope presented to the amplifiers, the PHY may be modified to use 8-ary PSK signal constellations instead of the QAM constellations.

Antenna Beamwidth

Omni-directional service is useful in tracking and locating collaborative hub 10 and user satellites 11 in ad hoc locations. An alternative is more directional antenna beam options, whose performance is improved over the omni-directional alternative, but location determination is required. Current Ka-band antenna technology offers omni-directional, sector, or high directivity (spot beam) coverage options. The Edge of Coverage (EOC) gain for an antenna is defined as its gain at −3 dB (half power) level.

Exemplary embodiments of the SbLAN system employ omni-direction antennas, sector coverage antennas, and/or high gain, steerable spot beam coverage antennas for the host 10 and mission satellites 11. The omni-directional antenna has a typical EOC gain of 0 dB. The sector coverage antenna has a 60° half-power beamwidth and has an EOC gain of 5 dB. The high gain, steerable spot beam coverage antenna has 6° half-power beamwidth and an EOC gain of 24.8 dB.

The bandwidth allocated for a transponder in commercial communication satellites is generally 36 MHz or 54 MHz. A client satellite 11 needs a maximum data rate of 30 Mbps to comfortably transmit 3-D High Definition TV signals; the nominal inter-satellite data rate (client satellite 11 to hub 10) needed is about 20 Mbps for a majority of applications. With the availability of latest mature coding techniques (e.g. LDPC) and high spectral efficiency modulations (e.g. 8PSK), the required operational bandwidth is about 15 MHz. Hence a single transponder in the hub satellite 10 will comfortably support multiple client satellites 11.

The amplifier power levels are evaluated to obtain a minimum link margin of 3 dB for the SbLAN system HPA power requirements were evaluated when the client satellite 11 is at a distance of 200 km from the hub satellite 10 and the inter-satellite data rate is 30 Mbps; different antenna combinations have been considered while performing the link calculations. The EOC gain values are used, for all antennas, while deriving the power levels.

Antennas employed in various embodiments of the SbLAN system are discussed below.

High Gain Spot Beam Antennas on Both the Hub and Client Satellites

In this embodiment, since the antennas generate high gain narrow beams, tracking is required for both antennas, resulting in bulky systems. Moreover, the hub satellite 10 needs to track multiple client satellites 11, which can only be achieved by a complex Phased Array antenna. The client satellite 11 needs an RF power of about 0.3 W only, at the antenna input, to achieve a throughput of 30 Mbps.

High Gain Spot Beam Hub Antenna and Sector Beam Client Antenna

In this embodiment, the client satellite 11 must disclose its location to the hub satellite 10. Moreover, Phased Array antenna technology is needed for the hub satellite 10 to track multiple client satellites 11. Each satellite requires an RF power of about 30 W, at the antenna input, to achieve a throughput of 30 Mbps.

Sector Beam Hub Antenna and High Gain Spot Beam Client Antenna

In this embodiment, two Sector Beam antennas on the hub satellite 10, one each facing East and West directions, cover all the client satellites 11 within a distance of 200 km. Also, the client satellite 11 does not have to disclose its position or location to the hub spacecraft. Each satellite requires an RF power of about 30 W, at the antenna input, to achieve a throughput of 30 Mbps.

Sector Beam Antennas on Both Hub and Client Satellites

In this embodiment, tracking is not required for either spacecraft. With an industry-standard TWTA output RF power of 150 W, the achieved throughput is about 1.2 Mbps.

High Gain Spot Beam Hub Antenna and Omni-Directional Client Antenna

In this embodiment, the client satellite 11 must disclose its location to the hub satellite 10. Moreover, Phased Array antenna technology is needed for the hub satellite 10 to track multiple client satellites 11. Each satellite requires an RF power of about 95 W, at the antenna input, to achieve a throughput of 30 Mbps.

Omni-Directional Hub Antenna and High Gain Spot Beam Client Antenna

In this embodiment, tracking is not needed for the hub satellite 10. Each satellite requires an RF power of about 95 W, at the antenna input, to achieve a throughput of 30 Mbps.

Sector Beam Hub Antenna and Omni-Directional Client Antenna

In this embodiment, two Sector Beam antennas on the hub satellite 10, one each facing East and West directions, cover all the client satellites 11 within the distance of 200 km. With the usage of a practical TWTA, of 150 W output power, the throughput achieved would be about 375 Kbps.

Omni-Directional Hub Antenna and Sector Beam Client Antenna

In this embodiment, each satellite requires a 150 W TWTA, the throughput drops to about 375 Kbps.

Omni-Directional Antennas on Both Hub and Client Satellites

In this embodiment, the antennas are simple in construction, and with a TWTA generating 150 W output power, the throughput data rate drops to about 120 Kbps.

According to an exemplary embodiment of the SbLAN system: a) throughput data rate should be large enough to sustain HDTV transmission, b) SSPA is preferred for the client satellite 11; however space qualification is necessary to achieve 30 W output power, c) the client satellite 11 should exhibit LPI and LPD characteristics, and d) reflector and aperture-type antennas are simpler and have lower costs as compared with Phased Array antennas.

In an exemplary embodiment of the SbLAN system, optimum results are provided using Sector Beam antennas for the hub satellite 10, and a steerable Spot Beam antenna for the client spacecraft 11.

For the Hub Sector Antenna 124 and a Client Spot Beam Antenna 120 embodiment, the minimum required power level is 3.2 Watts. This power output is realizable with minimum modifications to existing SSPA technology and leads to considerable savings in mass and power of the units.

By keeping the minimum distance of separation between the hub 10 and any client satellite 11 to be 150 km, these satellites can be maintained in two separate control boxes, requiring no coordination between the hub 10 and the client satellites 11. Hence, the RF power requirements were determined for this intermediate distance of 150 km. The nominal throughput data rate is maintained at 20 Mbps. For the hub Sector Beam antenna 124 and a client Spot Beam antenna 120 embodiment, the required SSPA power level is 7.1 Watts.

Interference Analysis

Within the hub satellite 10 environment, there are mainly two classes of intra-system scattering sources:

(1) Exposed equipment such as antenna feed horns, earth sensors, panel edges, etc. can cause line scattering effects. In a typical scenario, the scattered energy from these sources is a minimum 20 dB below the direct Line of Sight (LOS) signals; and (2) Large objects such as reflector antennas, solar radiating array panels, etc. can cause specular reflection effects. The specular reflected signals can, in some instances, be as strong as the LOS signal.

In the worst case scenario, a channel Ricean Fading would occur and impact the desired LOS communication signals. The resultant Ricean Field is a vector sum of the LOS component and the Scattered Field component. For the line scattering sources with scattered fields 20 dB below the LOS field, the maximum depth of Ricean fade is about 0.9 dB. For specular reflection sources, the channel density function can be modeled as Rayleigh distribution. Depending on the strength of the signals incident on this type of scatterers, the Rayleigh distribution interference can lead to an infinite fading or total signal cancellation.

The antennas used in an exemplary embodiment of the SbLAN system alleviate these interference problems. The high gain Spot Beam and Sector Beam antennas exhibit typical side lobe levels, in the directions of the scattering sources, far below 20 dB; these low side lobe levels, in turn, lead to minimal interference effects.

The Omni-directional antenna included in an alternate embodiment of the SbLAN system typically exhibits an azimuth radiation pattern. The antenna provides an additional rejection of about 12 dB in the direction of the scattering sources. The worst case fade level with this specular reflection is about 2.5 dB. Since a sufficient overall system margin (min. 3 dB) has been maintained, these interference effects are sufficiently mitigated. Moreover, the added benefit of using a Sector Beam antenna, instead of the Omni-directional antenna, in the hub spacecraft 10 is illustrated.

The inter-system interference sources, for an exemplary embodiment of the SbLAN system, are mainly due to any GEO, MEO and LEO satellites and ground systems operating at the same frequency. ITU has not allocated the Ka-Band ISL frequency (22.5 GHz) to any communication satellites in the GEO or MEO locations. The Iridium constellation, in LEO arcs, has ISL operation around 23.2 GHz. Since an exemplary embodiment of the SbLAN system has a proposed ISL frequency of 22.5 GHz, there will not be any direct interference from Iridium satellites. The ISL antennas used in Iridium system are highly directional with low side lobes radiating in the GEO direction; moreover, the interfering signals suffer an additional path loss of 33 dB while traversing from LEO to GEO. Considering all these factors, the maximum interfering signal level from an Iridium satellite would be more than 40 dB below the typical SbLAN carrier levels. Owing to the prohibitively high water vapor absorption levels, the ground-based systems do not operate over this frequency band; hence, there is no known source of interference from ground-based systems.

Communications System Capabilities

There are two key aspects of SbLAN system architecture that drive the routing functionality in the system. First, the number of clients 11 associated with a hub 10 is small relative to ground-based LANs. In particular, the target demonstration system is comprised of a hub 10 and two clients 11, while the number of clients 11 envisioned for nominal operations is potentially 5-10, and would not be expected to grow beyond another order of magnitude. Second, the connection of the clients 11 in an SbLAN cloud to the ground-based Global Information Grid (GIG) or Internet Backbone 22 would be through a gateway router 30 at the ground station 12. Thus, client packets need only to be routed to other clients 11 within the SbLAN or to the gateway router 30 which then routes them into the GIG or Internet Backbone 22. As a result, simple routing tables at both the client 11 and hub spacecraft 10 are sufficient and the memory and processing capacity for the routing tables is minimal in an exemplary embodiment.

In an embodiment of the SbLAN system with a digital hub 40, 50, routing within the space-based network is required of the hub satellite 10. To support this, either a stand-alone IPR 41 can be used, or the SDR 51 can host the routing functions. In either case, there are far more memory resources available than would be required for routing within the SbLAN network. Further, both the 802.16 and DVB-S2 protocols include IP and (in the case of 802.16) Ethernet convergence sublayers to seamlessly integrate with IP layer routing.

Throughput Goals

The key input assumptions for an exemplary embodiment of the SbLAN system are:

The allocated channel bandwidth in commercial communication satellites is generally 36 MHz or 54 MHz.

With the availability of proven compression technology, in typical satellite communication payloads, even High Definition TV programs would require a throughput of only 10 Mbps.

A maximum throughput data rate of 30 Mbps would help the SbLAN system to comfortably transmit very high quality 3-D signals. In order to accommodate throughputs of 100 Mbps, some modified choices are made regarding modulation and coding, but it is fully feasible to handle such a throughput within the possibility of 36 MHz and 54 MHz channels. The specific choice is facilitated by the extent of availability in the ground-to-hub link capacity. In other words, the ground-to-hub-to-ground link 21 is already occupied by commercial traffic, which was the main reason of existence for the commercial satellite 10. In order to accommodate the ground traffic to and from the constellation of client satellites 11, a certain percentage of the ground-to-hub-to-ground capacity must be allocated to the client satellites 11. Going even further, given the difference in link speeds between the uplink and downlink paths, the spare (bi-directional) ground-link percentage capacity intended for the client satellites 11 must be unequally allocated between uplink and downlink. In other words, a higher percentage of downlink availability will be contractually needed than on the uplink.

By applying high efficiency modulation techniques such as 8PSK and mature coding schemes such as LDPC (Low Density Parity Check), the 30 Mbps throughput signals could be transmitted with a frequency bandwidth of 15 MHz. Other possibilities are offered by DVB-S2 such as 16PSK and even 32PSK, which would enable the possibility of higher effective data rates without the fear of potentially violating available channel bandwidths.

Unlike 8PSK which requires that the transponder be largely non-linear and operate almost in saturation, in the case of higher order modulation, the linearity or quasi-linearity of the transponder may be an issue. Usually such modulation schemes require both a higher C/N (carrier to noise) ratio at the ground station and most importantly the implementation of specific predistortion methods to fight the transponder-induced linearity effects.

Different modulation/coding schemes can be easily engaged from either a VCM (variable coding & modulation) or ACM (adaptive coding & modulation) architectural approach (both of which are enabled by the DVB-S2 standard). The FPGA approach of implementing the SDR is obviously one of the key factors in ensuring performance.

According to an exemplary embodiment of the SbLAN system, software development techniques and methodology are used which enable the download of software on "hot" systems (meaning systems that actually run), without having to take them off-line or to shut them down for the upgrade or swap of code.

A single communication transponder in the hub spacecraft 10 supports multiple client satellites 11.

In an exemplary embodiment of the SbLAN system, the maximum inter-satellite data rate is 30 Mbps; and the nominal data rate is assumed to be 20 Mbps, as such a nominal throughput is sufficient for a majority of SbLAN applications.
System Monitoring The SDR platform may include self monitoring and safe-mode command capability. The types of system data available include multiple points of temperature monitoring, power supply voltage levels, current draws, software/operating system status, including command logs, command sequence execution results, system state (e.g., standby, transmitting/receiving), protocol stack information (frames sent, bit/frame error counts), link quality data, detectable and correctable/uncorrectable hardware error counts (resulting from singe event upsets, SEUs), etc. This information is available through both internal system logs retrievable upon command and the heartbeat telemetry that is provided on the SDR's standard 1553 digital bus interface.

Figure 12:
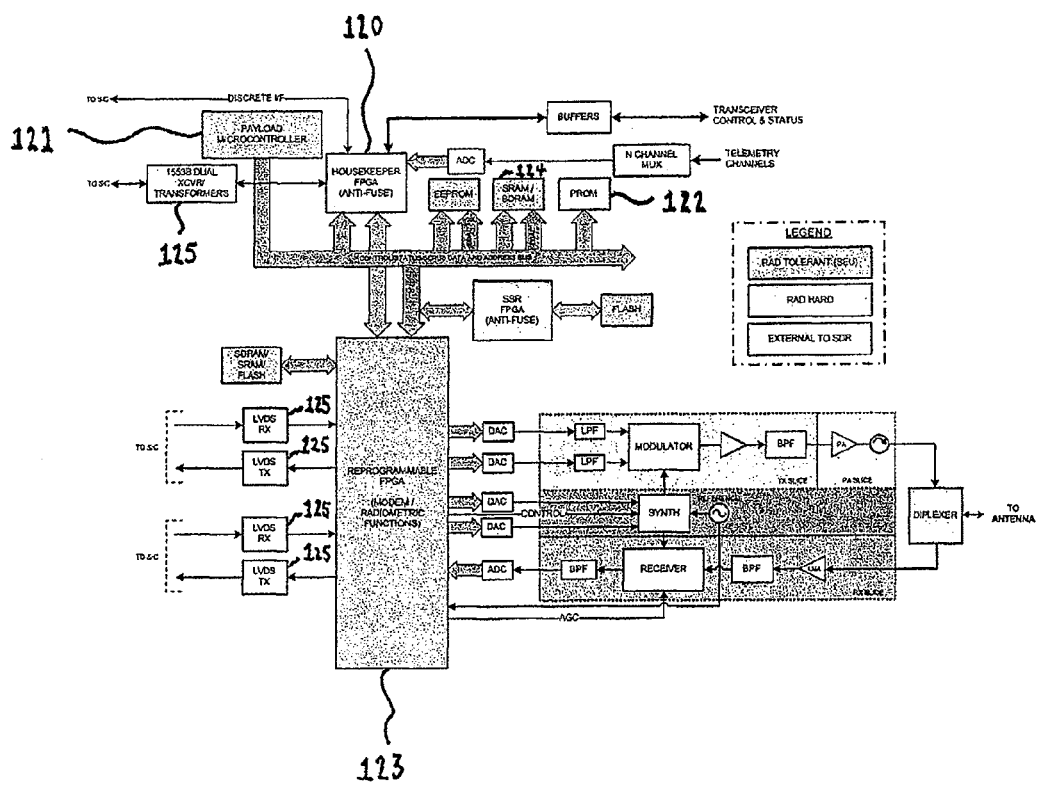
FIG. 12 shows an SDR digital slice block diagram according to an exemplary embodiment.

The hardware design for the system is described below, where it is shown that it is the rad-hard components built into the SDR that provide power-on boot-up functionality and analog and digital telemetry gathering functions. These rad-hard components also provide the communications interfaces for the military standard 1553 data buses and will function even if there is a fault in any of the rad-tolerant parts. The result is a robust capability for not only extensive system health monitoring and performance logging, but diagnostics and commanding (including re-flashing the system software and firmware) for fault recovery. The 1553 bus interface is industry standard with decades of proven flight heritage. With the delivery of an SbLAN SDR, a clear and comprehensive interface control document (ICD) would be generated to ensure full compatibility and interoperability with the host spacecraft.
Software Defined Radio Payload The SDR platform in an exemplary embodiment is designed using a modular, slice-based architecture. Typical slice functions are the power supply slice, the digital slice, and an IF/RF slice. The design of the SDR platform is similar for both the hub 10 and client 11 SbLAN kits. The difference in the hardware implementations between the hub 10 and client 11 SDRs 45, 51, 101, 110 is, in addition to the Ka-band IF/RF slice, the hub 10 includes a second IF/RF slice for the C-band SGL 21. The software/firmware implemented in the digital slices is where the hub/client functionality is differentiated. Specifically, the hub SDR 45, 51 includes capabilities typical of a base station in a point-to-multipoint topology, while the client SDR 101, 110 includes subscriber station functionality. If the bent-pipe hub SbLAN kit embodiment 60 is implemented, the hardware design of the client SDR 101, 110 does not change since full modem, digital processing, and routing functionality is still required. The SDR 45, 51, 101, 110 hardware and software are described below.
SDR Digital Slice FIG. 12 shows an SDR digital slice block diagram according to an exemplary embodiment. The digital slice provides the SDR platform its robust flexibility and capability. The digital slice is an integrated package of multiple FPGAs, application specific integrated circuits (ASICs), high-speed memory, and I/O ports. The design philosophies of reliability and reprogrammability for the SDR platform are reflected in the key components of the digital slice architecture:

Housekeeper (HK) FPGA 120: a rad-hard ASIC that provides the real-time clocks, frequency references, front end instrument or radio control (i.e., amplifier enable, etc.), analog monitor interfaces, FPGA and program memory scrub and error detection and correction (EDAC), 1553 I/O core and command pathway, and reset lines. These are all functions that must be "on" when the unit is first powered to begin the initialization of the SDR operating system, as well as memory protection and providing command and diagnostic telemetry I/O to the host spacecraft 10.

Central Processing Unit (CPU), or Payload Microcontroller 121: Rad-tolerant part that hosts SDR operating system. Single event upset (SEU) mitigation provided through redundant circuitry, built-in EDAC scrubbing of electrically erasable programmable read-only memory (EEPROM) and memory, and built-in checksum scrub on new program load and upon each boot. The CPU processes commands and interrupts from the spacecraft and maintains the configuration parameters for the rest of the SDR.

PROM (Programmable, Read-Only Memory) 122: a burn-once, rad-hard chip that contains CPU boot code, default/safe mode configuration, spacecraft interface drivers (1553), and basic command and monitor capability. The PROM 122 contains the capability to load new CPU programs to EEPROM.

Reprogrammable FPGA(s) 123: The rad-tolerant reprogrammable FPGA 123 performs all the high-speed specialized computation and digital processing, including high-speed digital I/O. SEU mitigation provided by scrubbing done by the HK, its program EDAC'd in the EEPROM and checked upon each load to the FPGA 123, as well as built-in checksum scrub on new program loads. In the SbLAN, this FPGA block 123 is comprised of two FPGAs in order to provide sufficient resources for the advanced media access control (MAC) and PHY implementations required for high-rate wireless networking. All critical FPGA based functions are typically cast in a triple mode redundancy form which provides exceptional protection against single event upsets for these functions.

SDRAM 124: High speed memory for the processing functions of the CPU 121, HK, and FPGA 123 processors. Rad-tolerant, with SEU mitigation provided by EDAC scrubbing by HK during reads and by CPU command.

I/O ports 125: High-speed LVDS ports and buffers, 1553 buffers and transformers, ADCs, DACs, and multiplexers are all rad-hard parts.

Hub Satellite Radio System

In an exemplary embodiment of the digital hub satellite SbLAN kit 40, 50, there are RF chains for each Tx/Rx link in the system and their connections to the SDR 45, 51, as well as the optional IPR 41. Spacecraft command, control and telemetry is provided via the standard 1553 interface.

By using a slice-based architecture for the SDR 45, 51, the platform that can be readily adapted to new mission applications.

Figure 13:
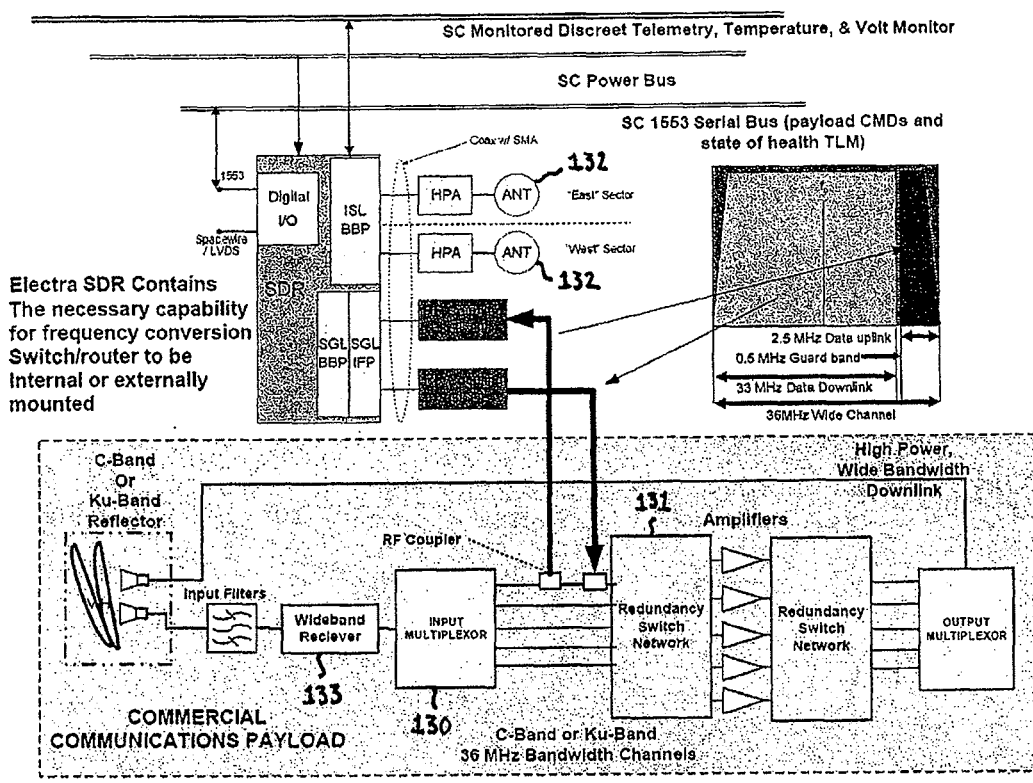
FIG. 13 shows a digital version of the hub SbLAN kit based on an SDR, according to an exemplary embodiment.

FIG. 13 shows a digital version of the hub SbLAN kit based on an SDR, according to an exemplary embodiment. The SbLAN kit passively taps into the communications payload at a point between the input multiplexer 130 and the front end redundancy switch network 131 of the RF power amplifiers. Commands sent to the payload are received via the communications antennas 132 that have been optimized for high gain over a geographic region specified by the spacecraft operator. The RF signal will be filtered and sent to a wide band receiver 133 for amplification and up conversion to the downlink frequency. From the receiver 133, the signal is multiplexed into the constituent 36 MHz wide channels (typical), one that has been preselected as the SbLAN dedicated channel. The SbLAN channel differs from the existing commercial communication channels only in that it has two 20 dB passive couplers inline with the amplifier input redundancy switch network 131. The passive couplers will allow for data streams sent from the ground station 12 to be transmitted directly to the SbLAN payload on the hub satellite 10 and then to the mission satellites 11, bypassing the spacecraft command and data handling system.

Client Satellite Radio System

In an exemplary embodiment, the hardware design of the SbLAN kit for the client satellites 11, 11' is similar to the design for the hub. The SbLAN kit for the client, however, only includes a single antenna and RF I/O pathway. Thus, there is only one RF slice required in the SDR platform, while the digital slice remains the same.

SDR Software Operating Environment

In an exemplary embodiment of the SDR software operating environment, uCLinux was selected as the operating system/environment for the SbLAN SDR payloads. Given the nature of the SbLAN system and the potential for multiple different operators/users to be integrating into an overall system, the result is much greater flexibility for a small cost in code size and deterministic behavior.

Although exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A space based local area network system for providing dynamically allocated downlink services for spacecraft in Geosynchronous Earth Orbit, the system comprising:

at least two client satellites which host an inter-satellite communications payload and which are in communication only with other satellites;

a hub satellite which hosts an inter-satellite communications payload, a downlink communications payload, and an aggregator payload; and a ground station which transmits data to and receives data from the hub satellite, wherein the hub satellite, using the aggregator payload, aggregates at least two data flows received from the at least two client satellites over an inter-satellite link, by the inter-satellite communications payload, into a data stream that is downlinked to the ground station, using the downlink communications payload, over a space-to-ground link.

2. The space based local area network system according to claim 1, wherein the ground station includes a space based local area network kit comprising:

a gateway router; and a software defined radio, wherein the gateway router routes data through the software defined radio which transmits data to and receives data from the hub satellite over the space-to-ground link.

3. The space based local area network system according to claim 1, wherein the hub satellite is a switched digital hub which includes a space based local area networking kit comprising:

a software defined radio; and an Internet protocol router, wherein signals received at the hub satellite are demodulated and packets are routed, and wherein packet data is remodulated onto the space-to-ground link or an inter-satellite link.

4. The space based local area network system according to claim 3, wherein the software defined radio hosts the Internet protocol router.

5. The space based local area network system according to claim 3, wherein the Internet protocol router is separate from the software defined radio.

6. The space based local area network system according to claim 1, wherein the hub satellite is a bent pipe hub which includes a space based local area networking kit comprising a radio frequency switching network.

7. The space based local area network system according to claim 6, wherein the radio frequency switching network comprises:

first dedicated uplink and first dedicated downlink RF channels for the space-to-ground link;

second dedicated uplink and second dedicated downlink Ka-band channels for hub-to-client links.

8. The space based local area network system according to claim 7, wherein the radio frequency switching network further comprises Ka-to-Ka band translation for communication between client satellites.

9. The space based local area network system according to claim 1, wherein the at least two client satellites includes a space based local area network kit comprising:

a software defined radio; and an Internet protocol router.

10. The space based local area network system according to claim 9, wherein the software defined radio hosts the Internet protocol router.

11. The space based local area network system according to claim 9, wherein the Internet protocol router is separate from the software defined radio.

12. The space based local area network system according to claim 1, wherein a frequency band around 22.5 GHz is used for data transfer over the inter-satellite link between the at least two client satellites and the hub satellite.

13. The space based local area network system according to claim 1, wherein the inter-satellite link uses an 802.16 physical layer.

14. The space based local area network system according to claim 13, wherein the 802.16 physical layer uses 8PSK modulation and a low density parity check coding scheme.

15. The space based local area network system according to claim 1, wherein the hub satellite further comprises a sector beam antenna, and the at least two client satellites further comprise a steerable spot beam antenna.

16. The space based local area network system according to claim 1, wherein the at least two client satellites are positioned within 300 km of the hub satellite.

17. The space based local area network system according to claim 3, wherein the software defined radio comprises:
a first IF/RF digital slice; and
a second IF/RF digital slice,
wherein the first IF/RF digital slice and the second IF/RF digital slice each comprise an integrated package of multiple field programmable gate arrays, application specific integrated circuits, high-speed memory, and I/O ports.

18. The space based local area network system according to claim 17,
wherein the first IR/RF digital slice is a Ka-band IF/RF digital slice and the second IF/RF digital slice is a C-band IF/RF digital slice,
wherein the first IF/RF digital slice includes software or firmware for performing Ka-band signal transmission, and
wherein the second IF/RF digital slice includes software or firmware for performing C-band signal transmission.

19. The space based local area network system according to claim 9, wherein the software defined radio comprises a Ka-band IF/RF digital slice,
wherein the Ka-band IF/RF digital slice comprises an integrated package of multiple field programmable gate arrays, application specific integrated circuits, high-speed memory, and I/O ports, and
wherein the Ka-band IF/RF digital slice includes software or firmware for performing Ka-band signal transmission.

20. A space based local area networking kit for a hub satellite which provides dynamically allocated downlink services for spacecraft in Geosynchronous Earth Orbit, the space based local area networking kit comprising:
a software defined radio; and
an Internet protocol router,
wherein the hub satellite is in communication only with other satellites, and
wherein the software defined radio and the Internet protocol router are configured to demodulate signals received at the hub satellite from at least two client satellites over an inter-satellite link or a ground station over a space-to-ground link, route packets, and remodulate packet data onto one of the inter-satellite link and the space-to-ground link.

21. A method for providing dynamically allocated downlink services for spacecraft in Geosynchronous Earth Orbit, the method comprising:
receiving, at a hub satellite, data transmitted over an inter-satellite link from at least two client satellites that are in communication only with other satellites;
aggregating the data transmitted over the inter-satellite link from the at least two client satellites; and
transmitting the aggregated data from the hub satellite to a ground station over a space-to-ground link.

22. The method of claim 21, wherein the inter-satellite link and the RF space-to ground link use at least one of C-band channels, Ku-band channels, Ka-band channels, S-band channels, or X-band channels.

23. The method of claim 21, wherein a frequency band around 22.5 GHz is used for data transfer over the inter-satellite link between the at least two client satellites and the hub satellite.

24. The method of claim 21, wherein the inter-satellite link uses an 802.16 physical layer.

25. The method of claim 24, wherein the 802.16 physical layer uses 8PSK modulation and a low density parity check coding scheme.

* * * * *